(12) United States Patent
Nakabayashi et al.

(10) Patent No.: US 8,237,627 B2
(45) Date of Patent: Aug. 7, 2012

(54) HEAD-MOUNTED DEVICE

(75) Inventors: Takaaki Nakabayashi, Kawasaki (JP); Toshiyuki Yasuda, Kawasaki (JP); Toshiki Ishino, Hiratsuka (JP); Yoshihiro Saito, Hachioji (JP); Toshiyuki Okuma, Chofu (JP); Kazuhide Miyata, Yokohama (JP); Hiroshi Komatsu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 959 days.

(21) Appl. No.: 12/256,379

(22) Filed: Oct. 22, 2008

(65) Prior Publication Data

US 2009/0128450 A1 May 21, 2009

(30) Foreign Application Priority Data

Oct. 26, 2007 (JP) .................................. 2007-279385

(51) Int. Cl.
*G09G 5/00* (2006.01)
(52) U.S. Cl. .......................... 345/8; 2/414; 2/424; 2/452
(58) Field of Classification Search .............. 2/414, 424, 2/452; 345/8
See application file for complete search history.

(56) References Cited

U.S. PATENT DOCUMENTS

| 5,321,416 A * | 6/1994 | Bassett et al. ...................... 345/8 |
| 5,671,037 A * | 9/1997 | Ogasawara et al. ........... 351/158 |
| 5,680,656 A * | 10/1997 | Gath ................................. 2/424 |
| 2007/0266481 A1 * | 11/2007 | Alexander et al. ................ 2/414 |

FOREIGN PATENT DOCUMENTS

| JP | 07-333547 A | 12/1995 |
| JP | 08-088814 A | 4/1996 |

* cited by examiner

*Primary Examiner* — Quan-Zhen Wang
*Assistant Examiner* — Tony Davis
(74) *Attorney, Agent, or Firm* — Carter, DeLuca, Farrell & Schmidt LLP

(57) ABSTRACT

A head-mounted device for mounting on the head of a user includes a first pressing member for pressing a first portion of the head from a first direction; a second pressing member for pressing a second portion of the head from a second direction that is different from the first direction; a string member that concatenates the first pressing member and the second pressing member; a structure that guides the string member so that the first and the second pressing members move in the first and the second directions, respectively, according to changes in the length of the string member; and an adjusting unit that adjusts the length of the string member.

8 Claims, 8 Drawing Sheets

HEAD-MOUNTED DEVICE

BACKGROUND OF THE INVENTION

1. Field of the Invention

The present invention relates to a mounting mechanism of a head-mounted device.

2. Description of the Related Art

As a device that is used mounted on the head, a head-mounted display (hereinafter referred to as an HMD) is well known. HMDs are widely used because of their advantages: images can be viewed on a large screen easily; 3-D vision can be easily achieved; viewers can move along with the device; and so on. As a mounting mechanism of an HMD, widely known are mounting mechanisms that fix the HMD on the head by fastening the head contour with a belt-like member; and mounting mechanisms having a frontal region pressing member and an occipital region pressing member and that fix the HMD by pressing the HMD onto the head by moving the occipital region pressing member back and forth. With these mounting mechanisms, by loosening the members on the belt and moving the occipital region pressing member backwards, the HMD can be removed.

Also well known is a type of mounting mechanism in which the parietal region of the head is pressed to support the weight of the HMD in order to decrease slipping off in a downward direction due to the weight of the HMD (for example, see Japanese Patent Laid-Open No. H8-088814). Furthermore, when mounting the HMD, the HMD is preferably mounted easily while a display unit is being maintained at a position where images can be viewed properly. Thus, as a mounting mechanism that can easily be mounted while grasping the HMD with one hand, a type of mechanism using wire is described, for example in Japanese Patent Laid-Open No. H7-333547.

However, in the mounting mechanism described in Japanese Patent Laid-Open No. H8-088814, an adjusting mechanism for a pressing member for the head contour, and an adjusting mechanism for a parietal region pressing member are provided separately, and therefore there is a problem in that the mounting operation is complicated. Also, because there is a plurality of adjusting mechanisms, the size of the device increases correspondingly, causing a heavier weight.

Additionally, the mounting mechanism disclosed in Japanese Patent Laid-Open No. H7-333547 only presses onto the temporal region, not having a parietal region pressing member. Therefore, on one hand, the mounting operation of the HMD is simplified, but on the other hand, the HMD has to be held only by pressing the member onto the head contour, and when trying to hold the HMD so as not to slip off even if the head is moved, the pressing force to the head becomes high, rendering the mounting uncomfortable. Also, since the HMD has to be supported by one hand at the time of adjustment, there is a lack of stability.

SUMMARY OF THE INVENTION

The present invention was made in view of the above-described problems, and makes it possible to adjust a plurality of pressing members with different pressing directions simultaneously by operating one adjusting member, to further simplify the mounting operation.

A head-mounted device in one embodiment of the present invention includes a configuration as described below.

According to an aspect of the present invention, there is provided a head-mounted device for mounting on the head of a user. The head-mounted device includes: a first pressing member for pressing a first portion of the head from a first direction; a second pressing member for pressing a second portion of the head from a second direction that is different from the first direction; a string member that concatenates the first pressing member and the second pressing member; a guide unit that guides the string member so that the first and the second pressing members to move in the first and the second directions according to changes in the length of the string member; and an adjusting unit that adjusts the length of the string member.

Further features of the present invention will become apparent from the following description of exemplary embodiments with reference to the attached drawings.

BRIEF DESCRIPTION OF THE DRAWINGS

FIG. 2 is a perspective view of the HMD in the first embodiment, illustrating how wire runs through.

DESCRIPTION OF THE EMBODIMENTS

Exemplary embodiments of the present invention will now be described in detail in accordance with the accompanying drawings.

Figure 1:
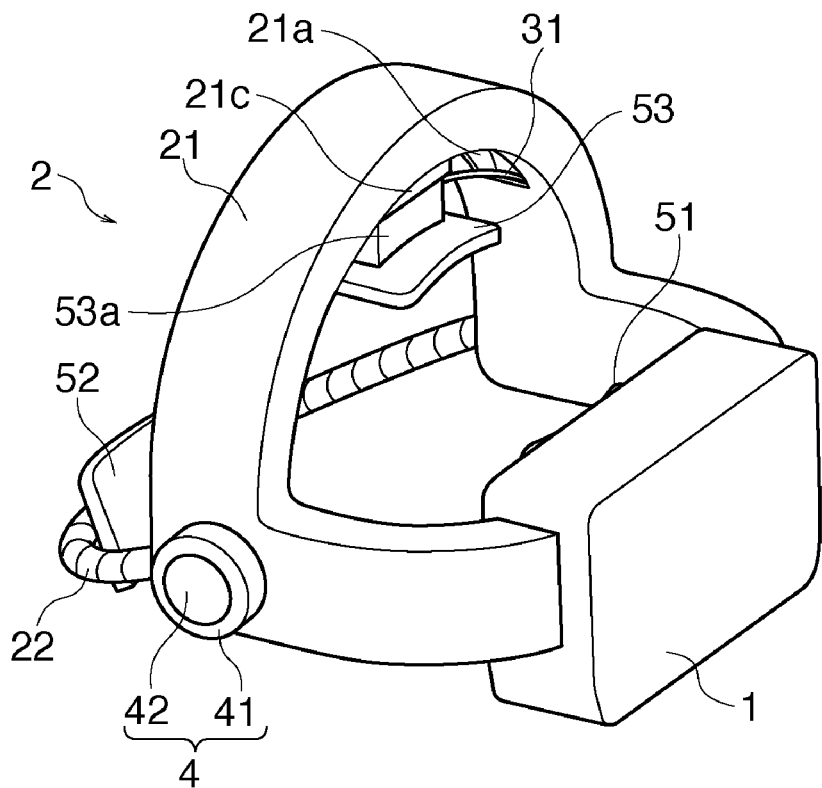
FIG. 1 is a perspective view of an HMD according to a first embodiment.
Figure 2:
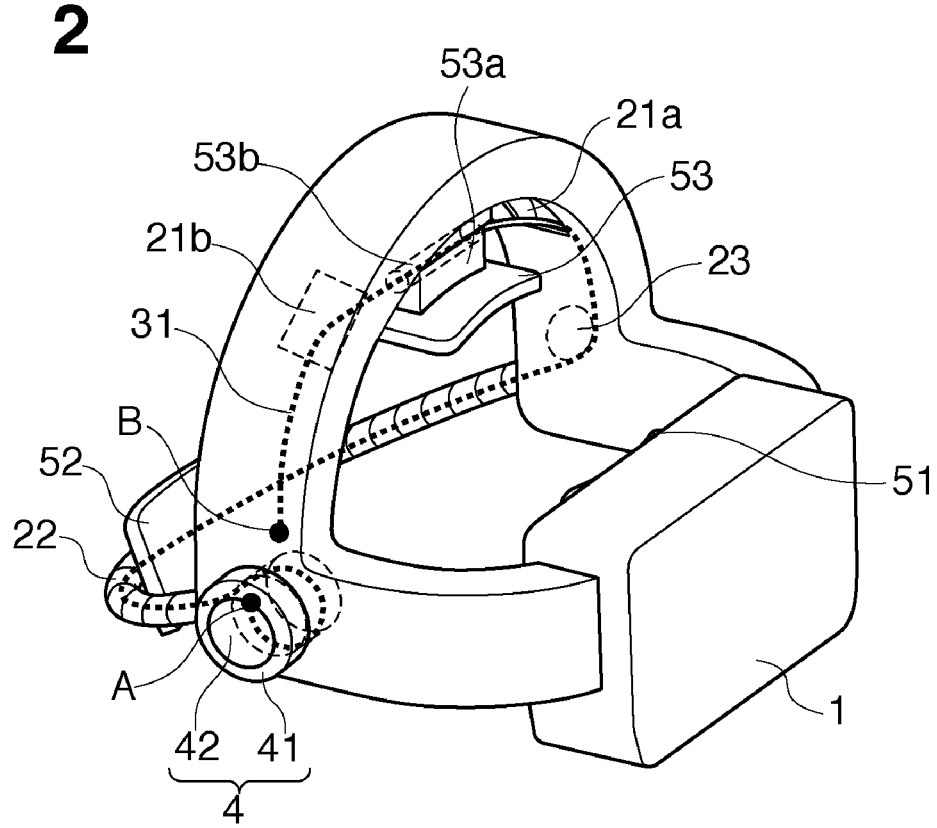
Figure 3:
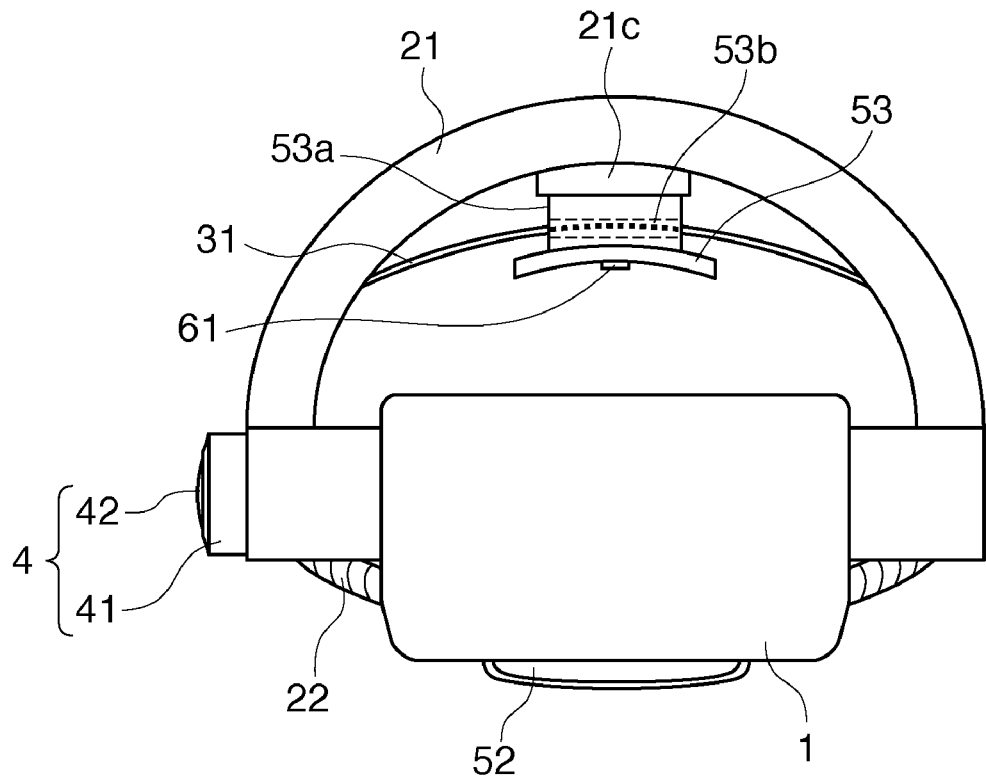
FIG. 3 is a front view of the HMD according to the first embodiment.
Figure 4:
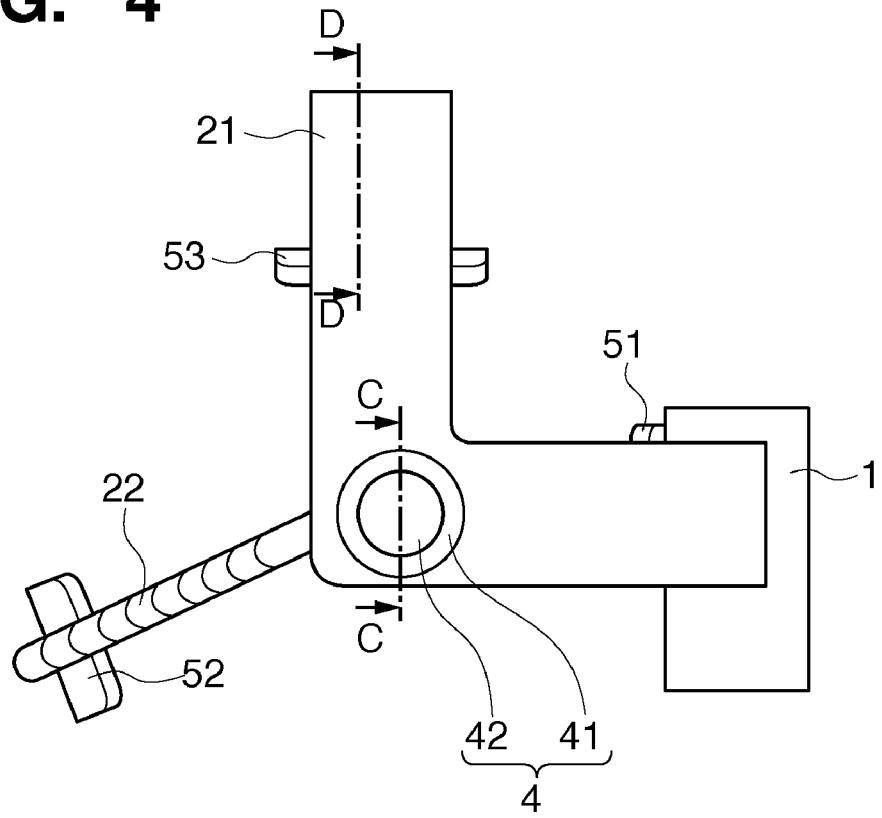
FIG. 4 is a side view of the HMD according to the first embodiment.

FIG. 1 and FIG. 2 are perspective views of a head-mounted display (HMD) as a head-mounted device according to a first embodiment. FIG. 3 is a front view of an HMD. FIG. 4 is a side view of an HMD. The HMD includes a display unit 1, and a mounting unit 2 for holding the display unit 1 in front of a viewer's eyes. In the display unit 1, a display element (not shown) that displays images inside the display unit 1, and an optical system (not shown) that enlarges the images displayed by the display element and introduces the images in front of the viewer's eyes are disposed. A rigid frame 21 (hereinafter, a frame 21) shaped so as to extend to the left and right temporal regions along the contour of the head and further to go over the parietal region is connected to the display unit 1. Furthermore, at the parietal region of the frame 21, apertures 21a and 21b are provided for passing through a string member 31 (hereinafter, a wire 31). In this specification, the contour of the head along the temporal region to the parietal region is referred to as a vertical contour.

Figure 10B:
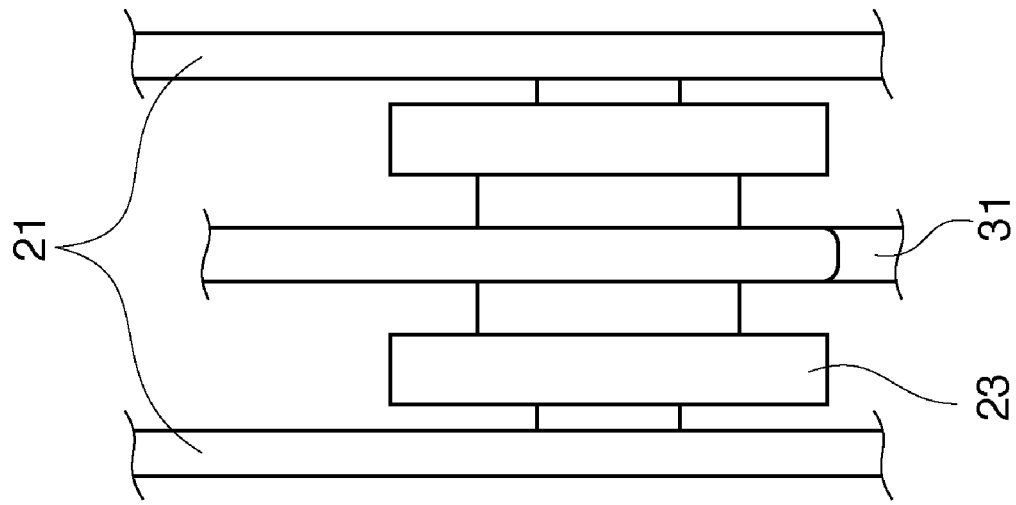
FIGS. 10A and 10B are diagrams of a holding member for changing the moving direction of a string member.
Figure 10A:
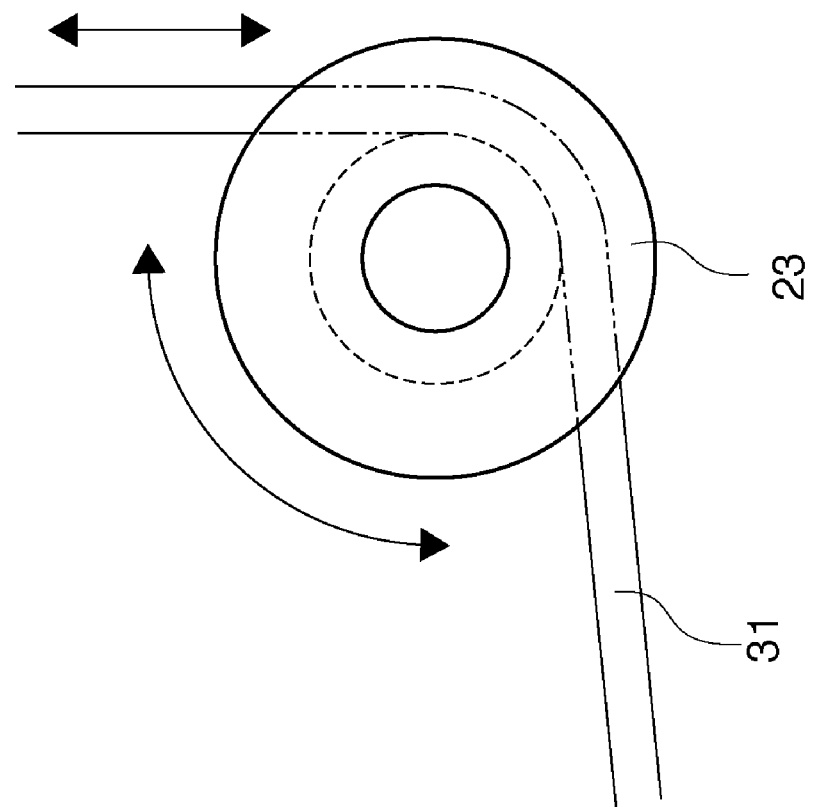

The wire 31 has a strength that endures tensions generated upon pressing the head with each pad (described later). Although a metal wire is used in this embodiment, for example, strings or threads may also be used. Furthermore, an elastic accordion-like elevating tube 22 is connected to the frame 21, so as to surround the occipital region from the temporal region. In this specification, the contour of the head along the temporal region to the occipital region is referred to as a horizontal contour. At an area corresponding to the left temporal region in the frame 21, a holding member (hereinafter, a pulley) 23 that changes the moving direction of the wire 31 from the horizontal contour to the vertical contour, and that holds the changed direction is provided. FIGS. 10A and 10B are diagrams of the pulley 23. The pulley 23 is attached rotatably to the frame 21, and rotates smoothly in line with the movement of the string member. The position for fixing the pulley 23 is not limited to this location. A member that smoothes out the movement or regulates the position of the wire 31 may also be provided at a different position.

The perspective view of FIG. 2 shows an arrangement of the wire 31. An end of the wire 31 is connected to a connecting portion A of an adjusting unit 4 attached rotatably to a portion of the right temporal region side of the frame 21, and the other end of the wire 31 is connected to a connecting portion B provided at a portion of the right temporal region side of the frame 21. The wire 31 passes through the elevating tube 22 from the connecting portion A of the adjusting unit 4, and passes through the parietal region from the left temporal region of the frame 21 via the pulley 23. The wire 31 once goes out from the aperture 21a provided in the frame 21, passes through a parietal region pad 53 to be described later, and goes into the frame 21 again from the aperture 21b at the opposing side of the frame 21, to be connected to the frame 21 at the connecting portion B. A frontal region pad 51 that presses the frontal region while the device is mounted is attached to the display unit 1.

An occipital region pad 52 that presses the occipital region while the device is mounted is attached to the elevating tube 22. Furthermore, at the parietal region of the frame 21, a parietal region pad 53 that presses the parietal region while the device is mounted is attached movably to the frame 21. The parietal region pad 53 is integrated with a parietal region pad guide 53a, that engages with a guide portion 21c provided on the frame 21 and is regulated to move in a straight line in the direction toward the head. A through hole 53b that the wire 31 passes through is provided in the parietal region pad guide 53a.

Figure 5:
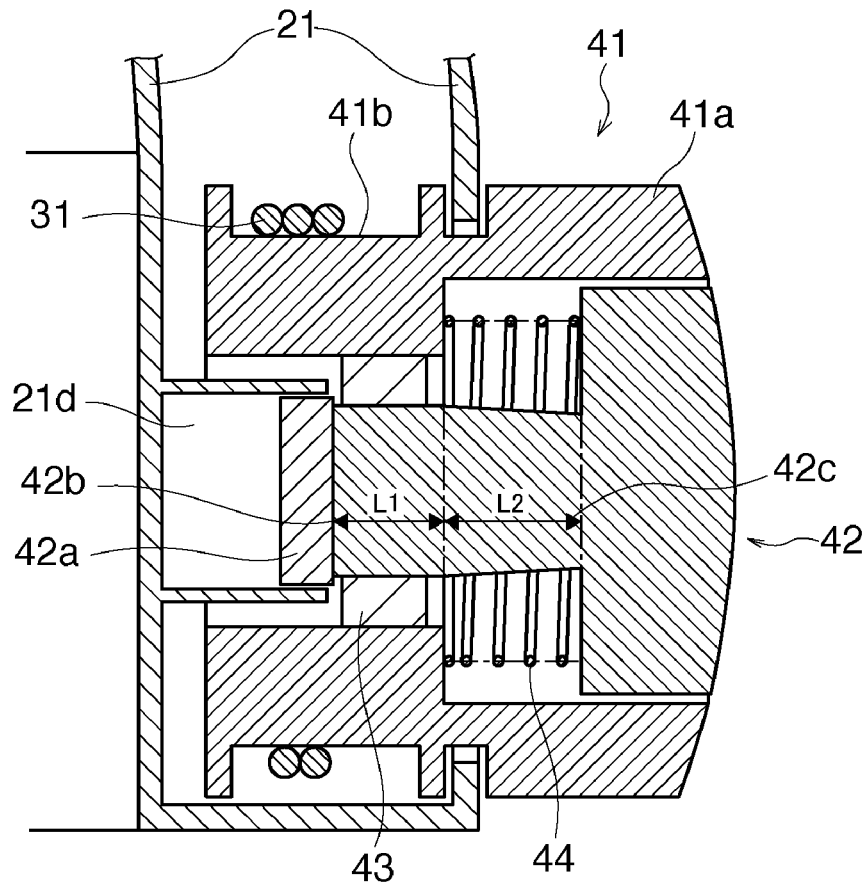
FIG. 5 is a cross-sectional view taken along line C-C in FIG. 4, illustrating the structure of an adjusting unit in an embodiment.

The adjusting unit 4 that adjusts the length of the wire 31 is described next. FIG. 5 is a cross-sectional view taken along line C-C in the adjusting unit 4 in FIG. 4. The adjusting unit 4 includes an adjusting dial 41, a release button 42, a one-way clutch 43, and a biasing spring 44. The adjusting dial 41 includes a knob portion 41a that a viewer operates while the device is mounted, and a wire take-up unit 41b for winding the wire in the frame 21. The adjusting dial 41 is integrated with the one-way clutch 43. The release button 42 includes a rotation stop portion 42a, a shaft portion 42b (FIG. 5, region of L1) that fits with the one-way clutch 43, and a tapered portion 42c (FIG. 5, region of L2) for releasing the fitting of the one-way clutch 43 upon pressing the release button.

The rotation stop portion 42a of the release button 42 is configured so that it is engaged with a rotation stop portion 21d provided at the side of the frame 21 and therefore is unable to rotate but moves only in the straight line direction (shaft direction). The one-way clutch 43 allows the adjusting dial 41 to rotate only in one direction with respect to the release button 42, and the adjusting dial 41 is locked and does not rotate in the other direction (hereinafter referred to as locked state). When the release button 42 is pressed, the shaft portion 42b is released from the fitting with the one-way clutch 43, thus being unlocked (hereinafter referred to as freed state). A biasing spring 44 that biases the release button 42 in the direction opposite to the release direction is incorporated between the adjusting dial 41 and the release button 42. Therefore, when not operating the release button 42, the shaft portion 42b is fitted with the one-way clutch 43, maintaining the locked state. One end of the wire 31 is connected to the adjusting dial 41 so that the wire 31 is wound when the adjusting dial 41 is rotated in the locked state.

Figure 6:
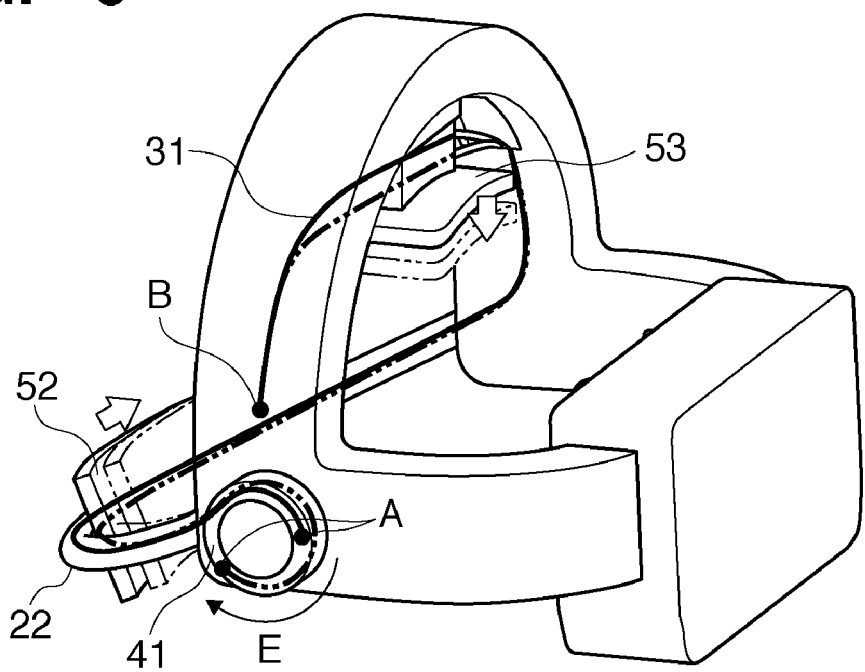
FIG. 6 is a diagram illustrating movement of pads by changes in the length of the wire around the head contour.

FIG. 6 is a diagram illustrating the movement of the parietal region pad 53 and the occipital region pad 52 when the adjusting dial 41 is rotated. When the adjusting dial 41 is rotated in direction E, the wire 31 is wound by the movement of the connecting portion A, thus shortening the length of the wire 31 at the contour of the head. Thus, the elevating tube 22 contracts, moving the occipital region pad 52 in the direction toward the head. Moreover, at the parietal region, as the wire 31 moves downward, the parietal region pad 53 moves in the direction toward the head. The rotation direction of the adjusting dial 41 in the locked state is not limited to the example given, in terms of both the adjusting direction and the lock direction. A mechanism that reverses the lock direction of the one-way clutch 43 may be provided so that a viewer can select the adjusting direction and the lock direction.

Figure 7A:
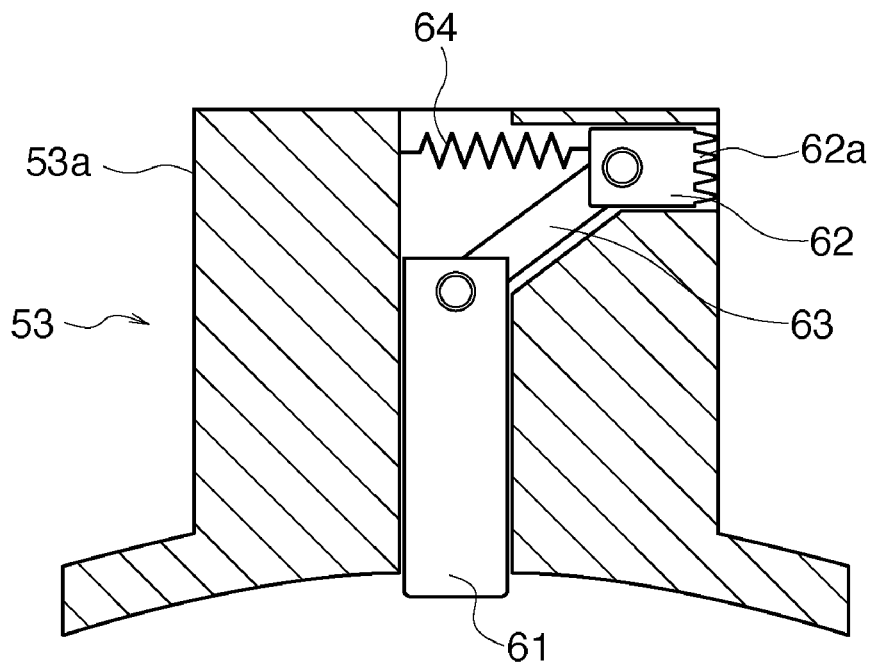
FIGS. 7A and 7B are diagrams illustrating an internal mechanism of a parietal region pad.
Figure 7B:
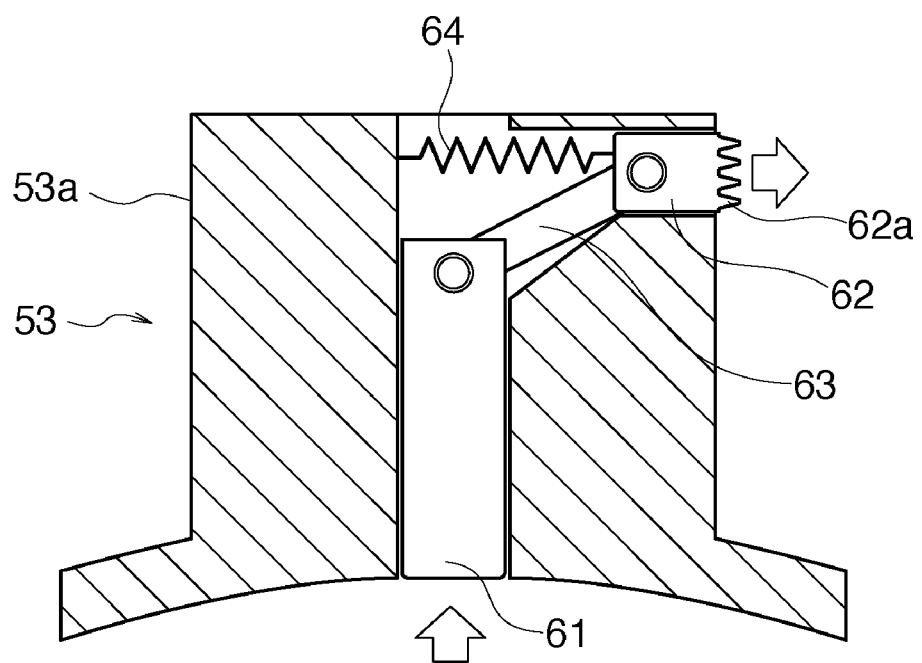

An HMD in the first embodiment includes a parietal region pad holding mechanism for holding the position of the frame 21 and the parietal region pad 53 while the device is mounted. FIGS. 7A and 7B are diagrams illustrating a parietal region pad holding mechanism provided at the parietal region pad 53. In the parietal region pad 53, a lock switch 61, a lock member 62, a link 63, and a tension spring 64 are provided. The lock switch 61 is disposed so as to allow the straight line movement in the pressing direction of the parietal region. The lock member 62 is disposed so as to allow the straight line movement in a direction different from the pressing direction of the parietal region. The lock member 62 is provided with a rack-type tooth 62a. The lock switch 61 is rotatably connected to the lock member 62 via the link 63. A tension spring 64 for biasing in the direction opposite to the lock direction is attached to the lock member 62.

Before the HMD is mounted, as shown in FIG. 7A, the lock switch 61 is projected from the parietal region pad 53. FIG. 7B shows the mechanism when the device is mounted, and when a viewer tightens the HMD to the head with a certain pressing force, the lock switch 61 is pressed in by the viewer's parietal region, and the lock member 62 is pressed out via the link 63.

Figure 8A:
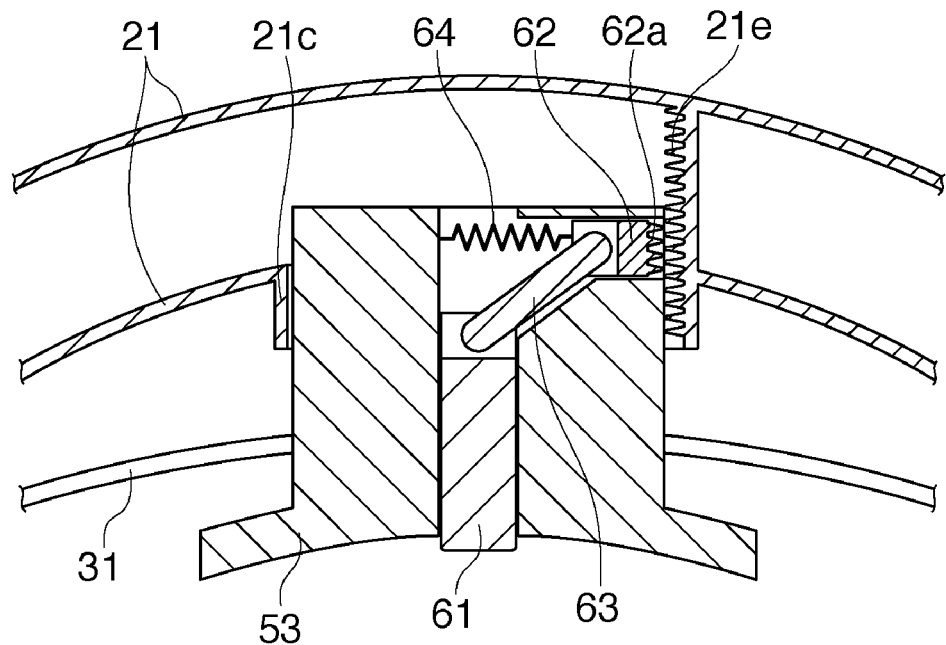
FIGS. 8A and 8B are cross-sectional views taken along line D-D in FIG. 4, illustrating the structure of a parietal region pad holding mechanism.
Figure 8B:
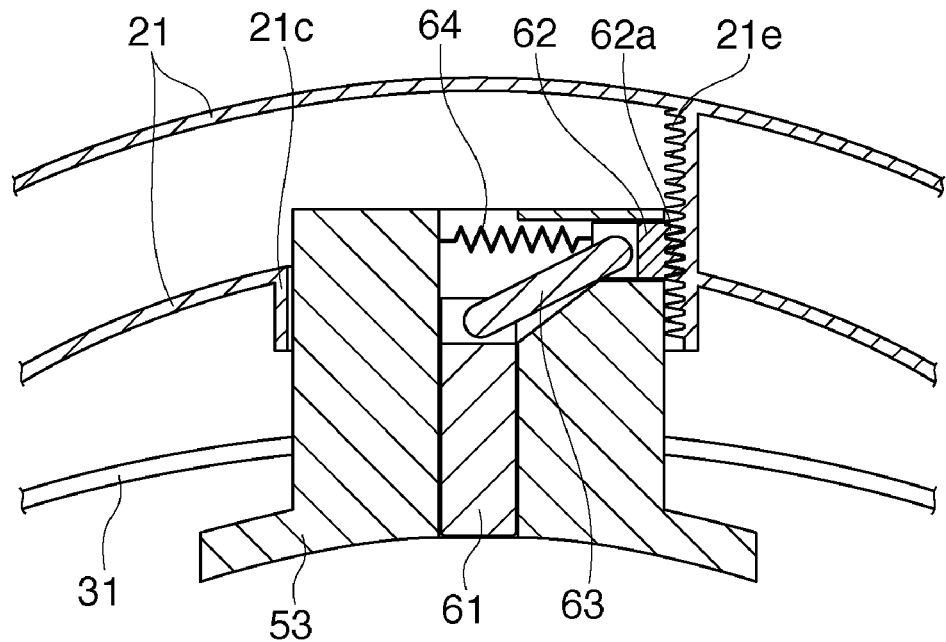

FIGS. 8A and 8B are cross-sectional views taken along line D-D in FIG. 4. FIG. 8A illustrates the lock switch 61 when not pressed in. FIG. 8B illustrates the lock switch 61 pressed in. The frame 21 is provided with a tooth 21e that is in gear with the tooth 62a of the lock member 62. When the lock switch 61 is not pressed in, as shown in FIG. 8A, the tooth 62a and the tooth 21e are not in gear and therefore the parietal region pad 53 moves upwardly and downwardly with respect to the frame 21 according to the length of the wire 31. When the length of the wire 31 is shortened and the parietal region pad 53 presses the viewer's head, the lock switch 61 is pressed in. Then, as shown in FIG. 8B, the lock member 62 is pressed out to the frame 21 side, allowing the lock member's tooth 62a and the frame's tooth 21e to be in gear, holding the position of the parietal region pad 53. When the force that presses in the lock switch 61 is released, the tension spring 64 allows the lock member 62 to be taken in the direction opposite to the lock direction, allowing the lock switch 61 to go down. The spring force of the tension spring 64 may be used to adjust the pressing force for the parietal region pad 53 to be locked.

In the following, operations and actions of the HMD in this embodiment while the device is mounted are described. A viewer first firmly grasps the frame 21 at the left and right sides of the head with the left hand, and holds the adjusting dial 41 with the right hand. The frontal region is brought into contact with the frontal region pad 51, and the display unit 1 is positioned properly. After setting the position, the adjusting dial 41 is rotated. At this time, the viewer is able to operate the adjusting dial 41 without removing both of the viewer's hands from the HMD. Therefore, the head can be pressed by the pressing member while holding the display unit 1 at the correct position. When the wire 31 is wound and taken in by the operation of the adjusting dial 41 so that its length is shortened, the occipital region pad 52 and the parietal region pad 53 move simultaneously in the direction toward the head. At this time, since the frame 21 is rigid, the head is not fastened at an area other than the area where the pressing member is provided. Furthermore, since the wire 31 passes through inside the frame 21 and the elevating tube 22, not allowing direct contact with the viewer, safety is secured.

By further continuing the operation, either the occipital region pad 52 or the parietal region pad 53 is brought into contact with the head first, but the pressing force is not generated owing to an idle section of the wire 31 due to the loosening of the wire. By further rotating the adjusting dial 41 and bringing both of the occipital region pad and the parietal region pad in contact with the head, a pressing force is generated. Since the parietal region pad 53 is provided with the above-described holding mechanism, the lock is set when a certain pressing force is applied. Therefore, with further fastening, the parietal region pad 53 does not move, but only the occipital region pad 52 moves to press the occipital region. Thus, the HMD can be prevented from slipping out upwardly from the head due to the excessive application of the pressing force to the parietal region pad 53. Furthermore, an uncomfortable feeling when the device is mounted due to the force of slipping out upwardly can be decreased. The adjusting dial 41 only rotates in the direction that shortens the wire 31, and in the reverse direction, the lock is set. Therefore, the pressing of each pressing member is not loosened even if the hands are removed from the adjusting dial 41 after obtaining an appropriate pressing for holding the HMD.

When removing the HMD, the release button 42 is pressed to release the lock of the adjusting dial 41. This loosens the pressing of the occipital region pad 52, and also releases the force pressing the lock switch 61, and therefore the lock of the parietal region pad 53 is also released and loosened. Although the parietal region pad 53 is provided with a parietal region pad holding mechanism in this embodiment, an occipital region pad having the same configuration may be provided at an occipital region pad holding mechanism by connecting a rigid frame at the occipital region side.

Figure 9:
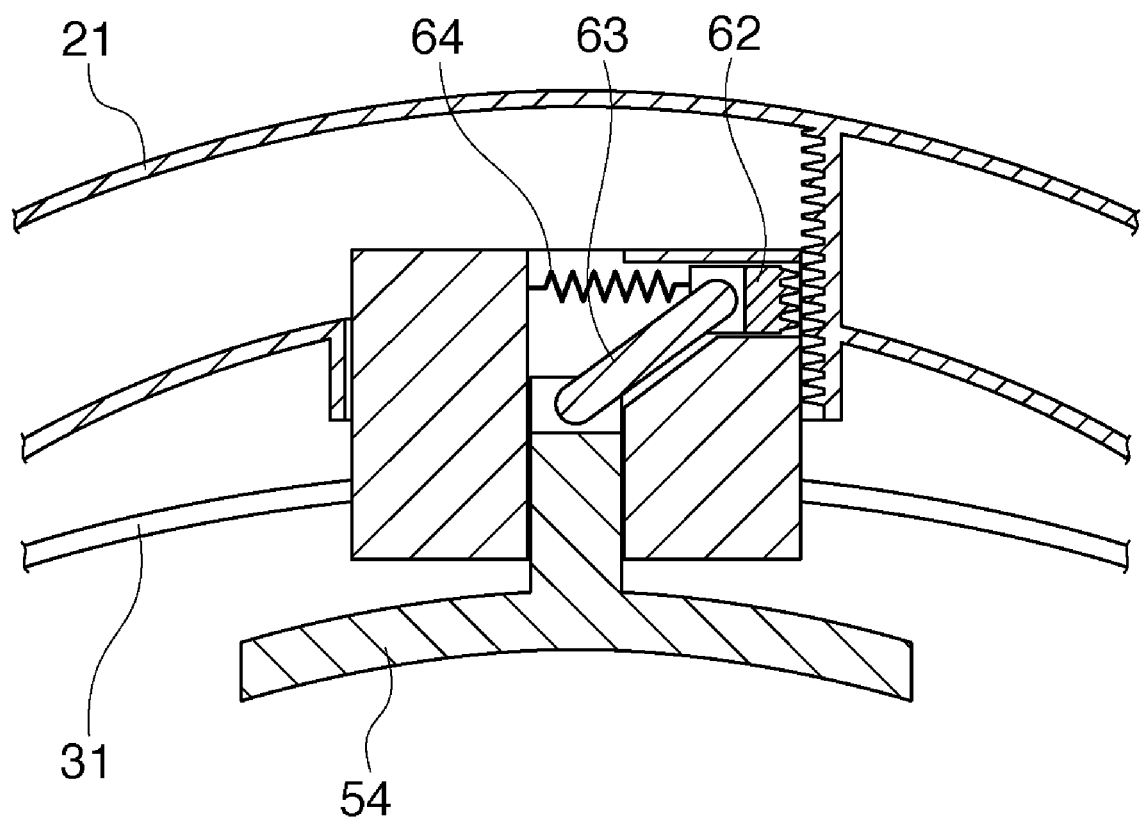
FIG. 9 is a diagram illustrating a modified example of the parietal region pad holding mechanism.

FIG. 9 is a diagram illustrating a parietal region pad holding mechanism provided with a parietal region pad 54 in which the above-described lock switch 61 and the pad portion of the parietal region pad 53 are integrated. By integrating the parietal region pad with the lock switch, the local pressing feeling of the head by the lock switch 61 can be eliminated. Such a holding mechanism may also be used.

As described above, based on the first embodiment, the HMD can be mounted by pressing the head with the pressing member while maintaining the display unit 1 at the correct position. Also, by providing the parietal region pad 53(54), slipping down of the display unit 1 can be decreased. Further, since the adjusting unit 4 at one position can operate the movable pressing members simultaneously at two positions, i.e., the occipital region and the parietal region, the operations when mounting can be easily carried out. When mounting, the pressing force of the parietal region pad is regulated, and therefore the HMD can be prevented from slipping in the upward direction, the weight of the HMD can be supported firmly by the parietal region pad, and the pressing can be carried out appropriately with the occipital region pad without an uncomfortable feeling.

Figure 11:
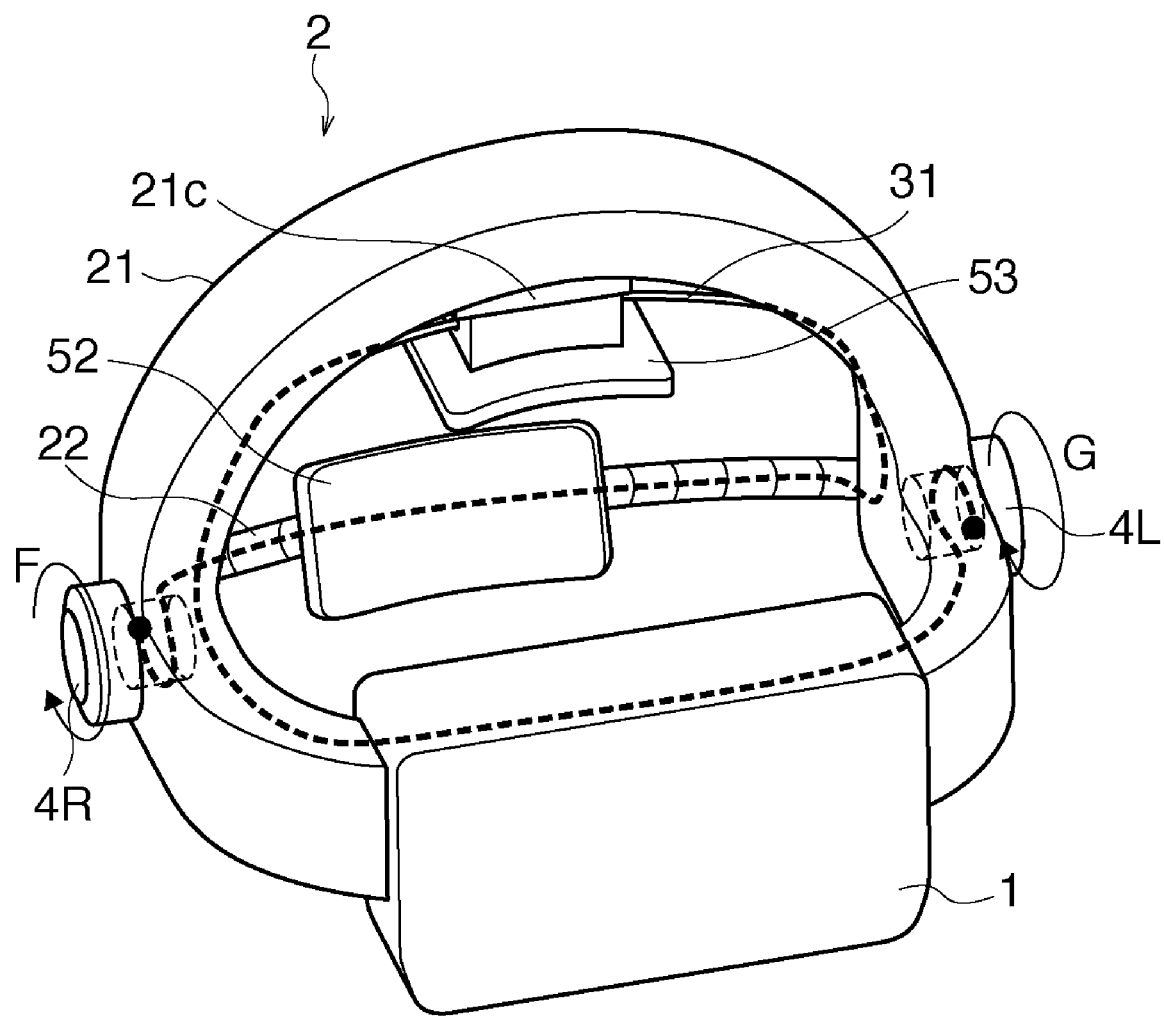
FIG. 11 is a perspective view of an HMD in a second embodiment.

Although the adjusting unit 4 is provided at a portion of the frame 21 corresponding to one of the temporal regions in the first embodiment, the present invention is not limited thereto. In a second embodiment, a case where the adjusting unit 4 is provided at regions of the frame 21 corresponding to both temporal regions is described. FIG. 11 is a perspective view of an HMD according to the second embodiment. In the second embodiment, a right adjusting unit 4R and a left adjusting unit 4L are provided at the right side and the left side of the frame 21, respectively. One end of the wire 31 is connected to the right adjusting unit 4R, and the other end of the wire 31 is connected to the left adjusting unit 4L. From the right adjusting unit 4R, the wire goes into the elevating tube 22, the parietal region of the frame 21, the parietal region pad 53, and goes in again to the parietal region of the frame 21. Then, the wire goes toward the display unit 1 from the right frame portion of the frame 21, passes through a wire guide portion (not shown) provided in the display unit 1 at an area not optically affected, and goes into the left frame portion of the frame 21, to be connected to the left adjusting unit 4L. By allowing the wire 31 to pass through the frontal region direction as described above, the wire 31 does not have to have a flexion point with an excessive angle. Further, with the configuration of FIG. 11, the wire 31 can be arranged without passing through the wire in the same region twice. Therefore, the length adjustment can be carried out smoothly without applying an excessive force to the wire 31. Further, an additional space does not have to be secured for allowing the two wires 31 to go through. By allowing the wire 31 to pass through in this way, the contour of the head can be surrounded and fastened entirely, and therefore this embodiment can be applied also to, for example, a configuration without the rigid frame 21 connected from the display unit 1. Although not shown, a pulley 23 for changing the direction of the wire from the vertical contour direction to the horizontal contour direction can be provided as in the first embodiment. For example, by providing the pulley 23 at the frame 21, at portions corresponding to the left and right temporal regions where the direction of the wire 31 is switched between the vertical contour and the horizontal contour, the length change of the wire 31 by the adjusting units 4R and 4L can be carried out smoothly.

The configuration of the right adjusting unit 4R and the left adjusting unit 4L is the same as that in the first embodiment. The connection is made so that the right adjusting unit 4R takes up the wire 31 when the adjusting dial is rotated in direction F, and the left adjusting unit 4L takes up the wire 31 when the adjusting dial is rotated in direction G. In either adjusting unit, the direction of the rotation of the adjusting dial in the locked state is not limited to the examples given, in terms of both the adjusting direction and lock direction. With such a configuration, the pressing member can be operated by one or both of the right adjusting unit 4R and the left adjusting unit 4L.

As described above, based on the second embodiment, the HMD can be mounted by adjusting the pressing to the head while holding the display unit 1 at the correct position. Further, since the parietal region pad 53 is provided, slipping of the display unit 1 in the downward direction can be decreased. Additionally, since the adjustment can be done by either the right adjusting unit 4R or the left adjusting unit 4L, the viewer can choose the one by which the operation can be carried out easily, improving the operation while the device is being mounted. Also, even if no regulation is provided in the moving direction, as in the case of the occipital region pad 52 in the second embodiment, the displacement can be decreased by operating with the left and the right adjusting units 4L and 4R.

Although one occipital region pad 52 and one parietal region pad 53 are provided in the above-described embodiment, the present invention is not limited to such an example. For example, two pressing members that press the head obliquely from a posterior position can be provided instead of the occipital region pad 52. Or, instead of the parietal region pad 53, two pressing members that press the head obliquely from an upper position can be provided.

As described above, an HMD (head-mounted device) mounted on the user's head according to the first and the second embodiments includes a plurality of pressing members with different pressing portions and directions. That is, the HMD includes a first pressing member for pressing a first portion on the horizontal contour of the head along the temporal region to the occipital region in a first direction. The HMD also includes a second pressing member for pressing a second portion on the vertical contour of the head from a portion on the horizontal contour along the parietal region in a second direction that is different from the first direction. To be specific, the occipital region pad 52 as the first pressing member presses the occipital region as the first portion in the frontward and backward direction with respect to the head as the first direction. Also, the parietal region pad 53 as the second pressing member presses the parietal region as the second portion in upward and downward directions with respect to the head as the second direction. The first pressing member and the second pressing member are concatenated by the wire 31 as the string member. The elevating tube 22, the pulley 23, the frame 21, and the apertures 21a and 21b provided at the frame 21 guide the string member so that the changes in the length of the string member allow the above-described first and second pressing members to move toward the first and the second directions. The adjusting unit 4 adjusts the length of the string member. With such a configuration, by operating the adjusting unit 4, a plurality of pressing members with different pressing directions can be adjusted simultaneously, rendering the operation while mounting the device easy. Also, by using the string member, the mechanism can be made simple and lightweight.

Furthermore, particularly, by using the occipital region pad and the parietal region pad as the first and the second pressing members, the weight of the HMD can be supported by the parietal region while holding the HMD by sandwiching the frontal region and the occipital region, so slipping of the display unit in the downward direction can be decreased.

Furthermore, in the first embodiment, the adjusting unit 4 is provided at a portion of the HMD corresponding to one of the right temporal region and the left temporal region when the HMD is mounted on the head (FIG. 2 shows an example in which the adjusting unit 4 is provided at a portion corresponding to the right temporal region). Therefore, when mounting the HMD, the HMD is grasped by both hands and the head is pressed by the pressing member while setting the display unit at the correct position, achieving simple operation when mounting the device, and improving stability as well.

The HMD of the second embodiment includes the right adjusting unit 4R as the first adjusting unit connected to one end of the string member for adjusting its length, and the left adjusting unit 4L as the second adjusting unit connected to the other end of the string member for adjusting its length. The right adjusting unit 4R and the left adjusting unit 4L are provided at portions of the HMD corresponding to the right temporal region and the left temporal region, respectively, when the HMD is mounted on the head (FIG. 11). With such a configuration, the pressing by the pressing member can be adjusted by any of the left and the right adjusting units. Therefore, an excellently operable mounting mechanism not dependent upon user's dominant hand can be provided. Furthermore, by carrying out the adjustment with respective left and right adjusting units, displacement of the pressing member by the movement of the string member can be decreased.

According to the HMD of the above-described first and second embodiments, a pad guide 53a is provided as a suppressing member for suppressing the moving direction of the parietal region pad 53 as the second pressing member. When adjusting the length of the string member with the adjusting unit 4, this suppressing member suppresses the movement of the second pressing member (parietal region pad 53) in a direction other than the second direction (other than the upward and downward directions). Since such a suppressing member suppresses the displacement of the pressing member in a direction other than the regulated directions due to the movement of the string member, the pressing in the parietal region direction can be carried out more reliably.

Further, in the HMD in the above-described first and second embodiments, a holding mechanism (FIGS. 7A and 7B, FIGS. 8A and 8B, and FIG. 9) for holding the position of the second pressing member according to the pressing of the second pressing member (parietal region pad 53) to the second portion (parietal region) is provided. With such a holding mechanism, the pressing force to the head by the pressing member, i.e., the pressing force to the parietal region by the parietal region pad 53 in the above-described embodiment can be regulated. Therefore, an uncomfortable feeling due to unbalanced pressing force (for example, when the pressing force to the parietal region causes the HMD to slip out upwardly) can be decreased.

In the HMD of the each of the above-described embodiments, the wire 31 as the string member is configured of one member. The string member concatenates the first pressing member and the second pressing member in order by the elevating tube 22, the pulley 23, the frame 21, and the apertures 21a and 21b provided at the frame 21, and is guided so as to surround the vertical contour and the horizontal contour of the user's head. By guiding the string member in this way, the parietal region and the occipital region can be pressed by one string member, allowing the configuration for the pressing by the string member to be simplified. Additionally, as shown in the second embodiment (FIG. 11), when the string member is allowed to pass through the three points, i.e., the parietal region, the occipital region, and the frontal region, the pressing can be carried out so as to surround the head's contour, and therefore the pressing can be carried out reliably.

Furthermore, the HMD of the above-described embodiments further includes the pulley 23 as an intermediate member for holding the string member, and this intermediate member allows the moving direction of the string member to be changed from the direction of the horizontal contour to the direction of the vertical contour. By providing the intermediate member that changes the moving direction of the string member, for example, when guiding the string member from the parietal region direction to the occipital region direction, the bending radius of the string member can be regulated. Therefore, with no excessive bending or flexion point occurring in the string member, the string member can be moved smoothly, improving operability of the pressing adjustment.

Furthermore, the HMD in each of the above-described embodiments includes the frame 21 connected to the display unit for showing images to the user and provided to follow the vertical contour; and the elevating tube 22 as an elastic member connected to the frame 21 and provided to follow the horizontal contour. The parietal region pad 53 as the second pressing member is provided on the frame 21, and the occipital region pad 52 as the second pressing member is provided at the elevating tube 22. The wire 31 as the string member is provided so as to pass through inside the frame 21 and the elevating tube 22, and guided so that the changes in the length of the string member (wire 31) by a plurality of pressing members with different pressing directions are converted to the pressing force to the head. With such a configuration, the string member can be prevented from contacting the user directly by allowing the string member to pass through inside the frame 21 and the elevating tube 22. By further providing the frame 21, the entire head contour can be prevented from being fastened when the length of the string member is adjusted to be shorter.

As described above, according to the present invention, by operating one adjusting member, a plurality of pressing members with different pressing directions can be adjusted simultaneously, and therefore operation when the HMD is mounted can be carried out easily.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-279385, filed Oct. 26, 2007, which is hereby incorporated by reference herein in its entirety.

What is claimed is:

1. A head-mounted device for mounting on the head of a user, the head-mounted device comprising:
   a first pressing member for pressing a first portion of the head from a first direction;
   a second pressing member for pressing a second portion of the head from a second direction that is different from the first direction;
   a string member that concatenates the first pressing member and the second pressing member;
   a guide unit that guides the string member so that the first and the second pressing members move in the first and the second directions according to changes in the length of the string member;
   an adjusting unit that adjusts the length of the string member;
   a frame connected to a display unit for showing images to the user; and
   an elastic member connected to the frame,
   wherein the first pressing member is provided on the elastic member, the second pressing member is provided on the frame, and the string member passes through inside the frame and the elastic member.

2. The head-mounted device according to claim 1, wherein the first pressing member presses an occipital region as the first portion, and the second pressing member presses a parietal region as the second portion when the head-mounted device is mounted on the head of the user.

3. The head-mounted device according to claim 1, wherein the adjusting unit is provided at a portion of the head-mounted device corresponding to either one of right and left temporal regions.

4. The head-mounted device according to claim 1,
   wherein the adjusting unit comprises a first adjusting unit that is connected to one end of the string member and adjusts the length of the string member, and a second adjusting unit that is connected to the opposing end of the string member and adjusts the length of the string member, and
   wherein the first adjusting unit and the second adjusting unit are respectively provided at portions of the head-mounted device corresponding to a right temporal region and a left temporal region.

5. The head-mounted device according to claim 1, further comprising a suppressing member that suppresses movement of the second pressing member in a direction other than the second direction when the adjusting unit adjusts the length of the string member.

6. The head-mounted device according to claim 1, further comprising a holding unit that holds the position of the second pressing member based on the pressing of the second portion by the second pressing member.

7. The head-mounted device according to claim 1,
   wherein the string member is configured of one member, and
   the guide unit concatenates the first pressing member and the second pressing member in order, and guides the string member along a horizontal contour and a vertical contour of the head so as to surround an occipital region and a parietal region of the head of the user.

8. The head-mounted device according to claim 7, further comprising an intermediate member that changes a moving direction of the string member.

* * * * *